US 11,760,916 B2

(12) United States Patent
Monteiro et al.

(10) Patent No.: US 11,760,916 B2
(45) Date of Patent: Sep. 19, 2023

(54) LOW DOSAGE HYDRATE INHIBITOR

(71) Applicant: Halliburton Energy Services, Inc., Houston, TX (US)

(72) Inventors: Deepak S. Monteiro, Houston, TX (US); Qiang Lan, The Woodlands, TX (US); Loan Vo, Houston, TX (US); Philippe Prince, Pearland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/419,126

(22) PCT Filed: Jan. 31, 2019

(86) PCT No.: PCT/US2019/016096
§ 371 (c)(1),
(2) Date: Jun. 28, 2021

(87) PCT Pub. No.: WO2020/159519
PCT Pub. Date: Aug. 6, 2020

(65) Prior Publication Data
US 2022/0106518 A1    Apr. 7, 2022

(51) Int. Cl.
*C09K 8/52*    (2006.01)
*C10L 3/10*    (2006.01)

(52) U.S. Cl.
CPC ............... *C09K 8/52* (2013.01); *C10L 3/107* (2013.01); *C09K 2208/22* (2013.01)

(58) Field of Classification Search
CPC ........ C09K 8/52; C09K 2208/22; C10L 3/107
See application file for complete search history.

(56) References Cited

U.S. PATENT DOCUMENTS

| | | | |
|---|---|---|---|
| 5,460,728 A | 10/1995 | Klomp et al. | |
| 5,648,575 A | 7/1997 | Klomp et al. | |
| 5,741,758 A * | 4/1998 | Pakulski | C09K 8/52 137/15.01 |
| 6,025,302 A | 2/2000 | Pakulski | |
| 6,214,091 B1 | 4/2001 | Klomp | |
| 7,264,653 B2 | 9/2007 | Panchalingam et al. | |
| 7,348,451 B2 | 3/2008 | Dahlmann et al. | |
| 7,381,689 B2 | 6/2008 | Panchalingam et al. | |
| 8,618,025 B2 | 12/2013 | Webber | |
| 2006/0237691 A1 | 10/2006 | Meier et al. | |
| 2017/0335169 A1 | 11/2017 | Lucente et al. | |

FOREIGN PATENT DOCUMENTS

| | | | | |
|---|---|---|---|---|
| CN | 104876265 A | * | 9/2015 | |
| WO | 2015120160 A1 | | 8/2015 | |
| WO | WO-2015120160 A1 | * | 8/2015 | ............... C09K 8/52 |
| WO | 2017105507 A1 | | 6/2017 | |
| WO | WO-2017105507 A1 | * | 6/2017 | ........... C07C 233/36 |
| WO | WO-2017184115 A1 | * | 10/2017 | ........... C07C 237/10 |

OTHER PUBLICATIONS

Kelland et al., History of the development of low dose hydrate inhibitors, Energy & Fuels, 2006, 20, 825-847.*
Kelland, M. A., "History of the Development of Low Dosage Hydrate Inhibitors". Energy & Fuels, 2006, vol. 20, No. 3, pp. 825-847.
PCT International Search Report and Written Opinion mailed in corresponding PCT Application No. PCT/US2019/016096 dated Oct. 21, 2019.

* cited by examiner

*Primary Examiner* — Kumar R Bhushan
(74) *Attorney, Agent, or Firm* — McAfee & Taft

(57) ABSTRACT

A low dosage hydrate inhibitor blend comprising a cationic surfactant and a co-surfactant. The cationic surfactant has the structural formula:

$$R^1-\underset{\underset{H}{|}}{C(=O)-N}-CH_2CH_2CH_2-\underset{\underset{R^4}{|}}{\overset{\overset{R^2}{|}}{N^+}}-R^3 \quad X^-$$

wherein: R1 is an alkyl group or alkenyl group having from 5 to 22 carbon atoms, R2 and R3 are alkyl groups having from 1 to 6 carbon atoms, R4 is a hydrogen atom or an alkyl group having from 1 to 6 carbon atoms, and X— is selected from the group of a carboxylate, an acrylate, a methacrylate, a halide, a phosphonate, a sulfate, a sulfonate, a hydroxide, a carbonate, or any combination thereof; and The co-surfactant is present in the inhibitor blend in an amount of no greater than about 10 percent by weight based on the total weight of the blend.

20 Claims, No Drawings

LOW DOSAGE HYDRATE INHIBITOR

BACKGROUND

This disclosure relates to the production, storage and transportation of natural gas and other hydrocarbon fluids.

A problem that can be encountered in connection with the production, storage and transportation of natural gas and other types of hydrocarbon fluids is the formation of gas hydrates from the fluids. Gas hydrate formation can inhibit the ability of natural gas and other hydrocarbon fluids to flow through conduits associated with the production of the fluids from oil and gas wells, as well as the subsequent storage and/or transportation of the fluids. For example, thermodynamic conditions favoring hydrate formation are often found in condensed water environments and natural gas pipelines. Gas hydrate formation can also be a significant problem in connection with offshore wells.

Gas hydrates fall into a class of chemical compounds known as clathrates. A clathrate is a compound characterized by a rigid open network in which molecules of one compound are physically trapped, without chemical bonding, within the crystal structure of another. In the case of a gas hydrate, a crystalline water molecule acts as the host molecule, which forms a "cage" around a smaller hydrocarbon molecule such as methane, thereby yielding ice-like crystals of gas and water. Examples of typical hydrate forming gases include nitrogen, carbon dioxide, and hydrogen sulfide and light hydrocarbons such as methane, propane, butane and heptane. Gas hydrates form at high pressures and low temperatures where gas and water are present.

Once formed, gas hydrates tend to agglomerate and adhere to one other, resulting in large ice-like crystals. Such crystals can form and adhere to the inside surfaces of conduits such as pipelines. For example, the gas hydrates can block well tubing, gathering and other flow lines, conduits of separators, pumps, compressors and other equipment, pipelines (including off-take pipelines and transmission pipelines), and other hydrocarbon conduits. In addition to impeding flow, gas hydrates can damage equipment such as valves and instrumentation.

Condensed water environments are often associated with offshore wells and other types of oil and gas wells. For example, condensed water can be condensed out of produced gas in production tubing and equipment. Hydrate inhibition in condensed water environments is particularly challenging due to a lack of solutes in condensed water that when present often assist in lowering sub-cooling.

Offshore wells and offshore transmission lines often operate at temperature and pressure conditions that favor the formation of natural gas hydrates. Natural gas hydrates tend to form at relatively low temperatures and high pressures. For example, methane gas hydrate is stable at the seafloor at water depths beneath about 500 meters.

Various methods have been employed for inhibiting and controlling gas hydrate formation. For example, a traditional approach involves the use of thermodynamic hydrate inhibitors such as methanol and ethylene glycol to shift the conditions (for example, the temperature and pressure) at which hydrates are stable, thereby causing existing hydrates to decompose and preventing the formation of new hydrates. If enough thermodynamic hydrate inhibitor is injected, hydrates will not form in the system. However, injecting enough thermodynamic inhibitor into needed locations can be an issue.

In condensed water environments, the problem of gas hydrate formation is typically addressed by using a higher dosage of anti-agglomerants, as compared, for example, to the amount of anti-agglomerants used in higher total dissolved solids water environments. However, a higher anti-agglomerant concentration can result in increased capital expenditures and operating expenses, particularly in connection with offshore wells.

As an alternative to traditional hydrate inhibitors, low dosage hydrate inhibitors (LDHIs) have been developed. Examples of LDHIs include kinetic hydrate inhibitors and anti-agglomerants. Kinetic hydrate inhibitors operate by delaying hydrate nucleation and/or growth for a period of time known as the induction time. Anti-agglomerants allow hydrates to form, but function to keep the hydrate particles relatively small, causing the particles to remain dispersed in the hydrocarbon fluid. The amounts of kinetic hydrate inhibitors and anti-agglomerants needed to be effective are significantly less than the amount of thermodynamic hydrate inhibitors, for example, typically required.

Both traditional hydrate inhibitors and LDHIs are added to the production system, for example, a wellbore or a pipeline. The optimal type and concentration of gas hydrate inhibitors is typically determined using rocking cell apparatus methodologies, which are performed in laboratory settings.

DETAILED DESCRIPTION

The present disclosure may be understood more readily by reference to this detailed description as well as to the examples included herein. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein.

As used herein and in the appended claims, the following terms and phrases have the corresponding definitions set forth below.

A "well" means a wellbore extending into the ground, any subterranean formation penetrated by the wellbore and all equipment and conduits associated with the well, including storage equipment and pipelines.

A "well fluid" means any fluid that is associated with a well, hydrocarbon storage equipment and/or hydrocarbon transportation pipeline.

The term "condensed water" means water that has condensed from a vapor phase to a liquid phase.

Unless otherwise specified, the term "alkyl," as used alone or in combination, means a saturated linear or branched primary, secondary, or tertiary hydrocarbon, including, but not limited to methyl, ethyl, propyl, isopropyl, butyl, isobutyl, t-butyl, and sec-butyl groups. The "alkyl" group may be optionally substituted where possible with any moiety, including but not limited to halo, haloalkyl, hydroxyl, carboxyl, acyl, aryl, acyloxy, amino, amido, carboxyl derivative, alkylamino, dialkylamino, phosphonoalkylamino, arylamino, alkoxy, aryloxy, nitro, cyano, sulfonic acid, thiol, imine, sulfonyl, sulfanyl, sulfonyl, sulfamonyl, ester, carboxylic acid, amide, phosphonyl, phosphinyl, phosphoryl, phosphine, thioester, thioether, acyl halide, anhydride, oxime, hydrazine, carbamate, phosphonic acid, phosphonate, or any other desired moiety that does not otherwise interfere with the activity or specific reactivity of the overall compound as set out within the present disclosure, or inhibit the desired activity or function of the overall compound in association with this disclosure, either unprotected, or protected as necessary, as known to those having ordinary skill in the art.

Unless otherwise specified, the term "alkenyl," as used alone or in combination, means a cyclic or non-cyclic alkyl having one or more unsaturated carbon-carbon bonds. The "alkenyl" group may be optionally substituted where possible with any moiety, including but not limited to halo, haloalkyl, hydroxyl, carboxyl, acyl, aryl, acyloxy, allyl, amino, amido, carboxyl derivative, alkylamino, dialkylamino, phosphonoalkylamino, arylamino, alkoxy, aryloxy, nitro, cyano, sulfonic acid, thiol, imine, sulfonyl, sulfanyl, sulfinyl, sulfamonyl, ester, carboxylic acid, amide, phosphonyl, phosphinyl, phosphoryl, phosphine, thioester, thioether, acyl halide, anhydride, oxime, hydrazine, carbamate, phosphonic acid, phosphonate, or any other desired moiety that does not otherwise interfere with the activity or specific reactivity of the overall compound as set out within the present disclosure, or inhibit the desired activity or function of the overall compound in association with this disclosure, either unprotected, or protected as necessary, as known to those having ordinary skill in the art.

Unless otherwise specified, the term "alkynyl," as used alone or in combination, means a cyclic or non-cyclic alkyl having one or more triple carbon-carbon bonds, including but not limited to ethynyl and propynyl. The "alkynyl" group may be optionally substituted where possible with any moiety, including but not limited to halo, haloalkyl, hydroxyl, carboxyl, acyl, aryl, acyloxy, amino, amido, carboxyl derivative, alkylamino, dialkylamino, phosphonoalkylamino, arylamino, alkoxy, aryloxy, nitro, cyano, sulfonic acid, thiol, imine, sulfonyl, sulfanyl, Sulfinyl, sulfamonyl, ester, carboxylic acid, amide, phosphonyl, phosphinyl, phosphoryl, phosphine, propargyl, thioester, thioether, acyl halide, anhydride, oxime, hydrazine, carbamate, phosphonic acid, phosphonate, or any other desired moiety that does not otherwise interfere with the activity or specific reactivity of the overall compound as set out within the present disclosure, or inhibit the desired activity or function of the overall compound in association with this disclosure, either unprotected, or protected as necessary, as known to those having ordinary skill in the art.

Unless otherwise specified, the term "aryl," as used alone or in combination, means an aromatic system containing one, two, or three aromatic and/or heteroaromatic rings wherein such rings may be attached together in a pendant manner or may alternatively be fused. The "aryl" group can be optionally substituted where possible with any moiety, including but not limited to alkyl, alkenyl, alkynyl, allyl, benzoyl, benzyl, heteroaryl, heterocyclic, carbocycle, alkoxy, oxo, aryloxy, arylalkoxy, cycloalkyl, tetrazolyl, heteroaryloxy; heteroaryl alkoxy, carbohydrate, amino acid, amino acid esters, amino acid amides, alditol, halogen, haloalkylthio, haloalkoxy, haloalkyl, hydroxyl, carboxyl, acyl, acyloxy, amino, aminoalkyl, aminoacyl, amido, alkylamino, dialkylamino, arylamino, propargyl, nitro, cyano, thiol, imide, sulfonic acid, sulfate, sulfonate, sulfonyl, alkylsulfonyl, aminosulfonyl, alkylsulfonylamino, haloalkylsulfonyl, sulfanyl, sulfamyl, sulfamoyl, carboxylic ester, carboxylic acid, amide, phosphonyl, phosphinyl, phosphoryl, thioester, thioether, oxime, hydrazine, carbamate, phosphonic acid, phosphate, phosphonate, phosphinate, sulfonamido, carboxamido, hydroxamic acid, sulfonylimide, or any other desired moiety that does not otherwise interfere with the activity or specific reactivity of the overall compound as set out within the present disclosure, or inhibit the desired activity or function of the overall compound in association with this disclosure, either unprotected, or protected as necessary, as known to those having ordinary skill in the art. In addition, adjacent groups on an "aryl" ring may combine to form a 5- to 7-membered saturated or partially unsaturated carbocyclic, aryl, heteroaryl or heterocyclic ring, which in turn may be substituted.

Unless otherwise specified, the term "acyl," as used alone or in combination, means a group of the formula "—C(O)R'," wherein R' is an alkyl, alkenyl, allyl, alkynyl, aryl, aralkyl, or propargyl group.

The terms and formulas "carboxy," "COOH," and "C(O)OH" are used interchangeably within the present disclosure.

A "polyetheramine" means a compound that includes at least one amino group attached to an end of a polyether backbone.

The term "amino" as used herein, alone or in combination, means a group of the formula NR'R", wherein R' and R" are independently selected from a group consisting of a bond, hydrogen, alkyl, aryl, alkaryl, aralkyl, alkenyl, allyl, alkynyl, and propargyl wherein the alkyl, aryl, alkaryl, aralkyl alkenyl, allyl, alkynyl, and propargyl may be optionally substituted where possible as defined above.

A component that "comprises" or "includes" one or more specified compounds means that the component includes the specified compound(s) alone, or includes of the specified compound(s) together with one or more additional compounds.

A component that "consists of" one or more specified compounds means that the component includes only the specified compound(s).

A component that "consists essentially of" one or more specified compounds means that the component consists of the specified compound(s) alone, or consists of the specified compound(s) together with one or more additional compounds that do not materially affect the basic properties of the component.

Whenever a range is disclosed herein, the range includes independently and separately every member of the range extending between any two numbers enumerated within the range. Furthermore, the lowest and highest numbers of any range shall be understood to be included within the range set forth. Additionally, whenever the term "C (alkyl range)" is used, the term independently includes each member of that class as if specifically and separately set out.

In accordance with the present disclosure, a low dosage hydrate inhibitor blend and a method of treating a well fluid are provided. As stated above, a "well" means a wellbore extending into the ground, any subterranean formation penetrated by the wellbore and all equipment and conduits associated with the well, including storage equipment and pipelines. For example, the well can be an oil well, a natural gas well, a water well or any combination thereof. A "well fluid" means any fluid that is associated with a well, hydrocarbon storage equipment and/or hydrocarbon transportation pipeline. For example, the well fluid can a hydrocarbon fluid such as natural gas or oil, water or any other type of fluid that has or will come into contact with natural gas, oil or another type of hydrocarbon fluid.

The low dosage hydrate inhibitor blend disclosed herein comprises:
a cationic surfactant, wherein the cationic surfactant has the structural formula (1), shown below:

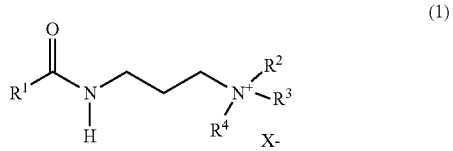

(1)

wherein: $R^1$ is an alkyl group or alkenyl group having from 5 to 22 carbon atoms, $R^2$ and $R^3$ are alkyl groups having from 1 to 6 carbon atoms, $R^4$ is a hydrogen atom or an alkyl group having from 1 to 6 carbon atoms, and X— is selected from the group of a carboxylate, an acrylate, a methacrylate, a halide, a phosphonate, a sulfate, a sulfonate, a hydroxide, a carbonate, or any combination thereof; and
a co-surfactant, wherein the co-surfactant is present in the inhibitor blend in an amount of no greater than about 10 percent by weight based on the total weight of the blend.

For example, $R^1$ of formula (1) can be an alkyl group having from 5 to 22 carbon atoms. For example, $R^1$ of formula (1) can be an alkyl group having from 11 to 17 carbon atoms. For example, $R^2$ and $R^3$ of formula (1) can be alkyl groups having from 1 to 4 carbon atoms. For example, $R^4$ of formula (1) can be a hydrogen atom or an alkyl group having from 1 to 2 carbon atoms. For example, X— of formula (1) can be selected from the group of a sulfonate, a carbonate, or any combination thereof.

For example, the co-surfactant of the inhibitor blend can be present in the inhibitor blend in an amount in the range of from about 0.01% by weight to about 10% by weight based on the total weight of the inhibitor blend. For example, the co-surfactant can be present in the inhibitor blend in an amount in the range of from about 0.1% by weight to about 10% by weight based on the total weight of the inhibitor blend. For example, the co-surfactant can be present in the inhibitor blend in an amount in the range of from about 1% by weight to about 5% by weight based on the total weight of the inhibitor blend.

For example, the co-surfactant of the inhibitor blend can include at least one polyetheramine. For example, the co-surfactant of the inhibitor blend can include a mixture of two or more polyetheramines. For example, the co-surfactant of the inhibitor blend can consist essentially of at least one polyetheramine. For example, the co-surfactant of the inhibitor blend can consist essentially of a mixture of two or more polyetheramines. For example, the co-surfactant of the inhibitor blend can consist of at least one polyetheramine. For example, the co-surfactant of the inhibitor blend can consist of a mixture of two or more polyetheramines.

As stated above, a "polyetheramine" is a compound that includes at least one amino group attached to an end of a polyether backbone. For example, the amino group of the polyetheramine(s) can be a primary amino group. For example, the amino group of the polyetheramine(s) can be a secondary amino group. For example, the polyether backbone of the polyetheramine(s) can be based on propylene oxide, ethylene oxide, or a combination thereof. For example, the polyether backbone of the polyetheramine(s) can be based on propylene oxide. For example, the polyether backbone of the polyetheramine(s) can be based on ethylene oxide.

For example, the polyetheramine(s) can be selected from the group of compounds that include one or more primary or secondary monoamines, diamines or triamines attached to one or both ends of a polyether backbone, and any combination of such compounds. For example, the polyetheramine(s) can be a compound that includes a primary diamine attached to an end of a polyether backbone that is based on propylene oxide or ethylene oxide.

For example, the polyetheramine(s) can be selected from the group of a polyoxypropylene diamine, a 3,6-dioxaoctamethylenediamine, and mixtures thereof. For example, the polyetheramine(s) can be a polyoxypropylene diamine. For example, the polyetheramine(s) can be a 3,6-dioxaoctamethylenediamine. For example, the polyetheramine(s) can be a mixture of a polyoxypropylene diamine and a 3,6-dioxaoctamethylenediamine, wherein the polyoxypropylene diamine is present in the mixture in an amount greater than 50% by weight based on the total weight of the mixture. For example, the polyetheramine(s) can be a mixture of a polyoxypropylene diamine and a 3,6-dioxaoctamethylenediamine, wherein polyoxypropylene diamine is present in the mixture in an amount greater than 75% by weight based on the total weight of the mixture. Examples of suitable polyetheramines for use as or as part of the co-surfactant of the inhibitor blend are marketed by Huntsman in association with the trademark JEFFAMINE®.

The low dosage hydrate inhibitor blend can optionally include other components as well. Examples include corrosion inhibitors and solvents. For example, suitable solvents include methanol, ethanol, ethylene glycol, hexane, xylene, toluene, and combinations thereof.

The method of treating a well fluid disclosed herein comprises combining a low dosage hydrate inhibitor blend with the well fluid. The low dosage hydrate inhibitor blend is the low dosage hydrate inhibitor blend disclosed herein and described above. The low dosage hydrate inhibitor blend mitigates problems caused by gas hydrates in the well fluid. The low dosage hydrate inhibitor blend does not necessarily inhibit hydrate formation in the well fluid, but it prevents the agglomeration of small hydrate clusters into large plugs.

For example, the well fluid can include a fluid produced from a well. For example, the well fluid can include a hydrocarbon or a fluid that has or will come into contact with a hydrocarbon.

For example, the well fluid can include a hydrocarbon. For example, the well fluid can include natural gas. For example, the well fluid can include oil.

For example, the well can include a fluid that has or will come into contact with a hydrocarbon. For example, the well fluid can include water that has or will come into contact with a hydrocarbon.

For example, the well fluid can be a mixture of a hydrocarbon and water. The water can come from a variety of sources. For example, the water can be fresh water or salt-containing water. Examples of salt-containing water include saltwater, brine (for example, saturated saltwater or produced water), seawater, brackish water, produced water (for example, water produced from a subterranean formation), formation water, treated flowback water, and any combination thereof. For example, the salt water can have in the range of from about 10,000 ppm to about 150,000 ppm total dissolved solids (TDS). For example, the salt water can have in the range of from about 50,000 ppm to about 100,000 ppm total dissolved solids (TDS).

For example, the well fluid can include mixture of a liquid hydrocarbon and water, wherein the mixture has a water cut in the range of from about 1% to about 99%. For example, the well fluid can include a mixture of a liquid hydrocarbon and water, wherein the mixture has a water cut of greater than about 5%. For example, the well fluid can include a mixture of a liquid hydrocarbon and water, wherein the mixture has a water cut of greater than about 10%. For example, the well fluid can include a mixture of a liquid hydrocarbon and water, wherein the mixture has a water cut of greater than about 15%. For example, the well fluid can include a mixture of a liquid hydrocarbon and water, wherein the mixture has a water cut of greater than about 20%. For example, the well fluid can include a mixture of a liquid hydrocarbon and water, wherein the mixture has a water cut of greater than about 25%. For example, the well fluid can include a mixture of a liquid hydrocarbon and water, wherein the mixture has a water cut of greater than about 30%. For example, the well fluid can include a mixture of a liquid hydrocarbon and water, wherein the mixture has a water cut of less than or equal to about 35%.

For example, the well fluid treated by the method can include a mixture of a hydrocarbon and water, wherein the water includes condensed water. For example, the condensed water can have in the range of from about 0 ppm to about 25,000 ppm total dissolved solids (TDS). For example, the condensed water can be present in the well fluid in an amount in the range of about 1% by volume to about 50% by volume weight percent, based on the total volume of the well fluid.

For example, the low dosage hydrate inhibitor blend can be combined with the well fluid by injecting the low dosage hydrate inhibitor blend into a well in which the well fluid is present through the wellhead of the well. For example, the low dosage hydrate inhibitor blend can be injected into a well through the wellhead of the well through an umbilical or capillary line extending through the wellhead into the well.

For example, the method of treating a well fluid disclosed herein can be used to treat a well fluid associated with an oil and gas well production system. For example, the method of treating a well fluid disclosed herein can be used to treat a well fluid associated with an oil and gas well production system that operates at high pressures and low temperatures. For example, the method of treating a well fluid disclosed herein can be used to treat a well fluid associated with an offshore oil and gas well production system. For example, the method of treating a well fluid disclosed herein can be used to treat a well fluid associated with an offshore oil and gas well production system that operates at high pressures and low temperatures. For example, the method of treating a well fluid disclosed herein can be used to treat a well fluid associated with an offshore oil and gas well production system that includes a condensed water environment.

As shown by the examples below, the cationic surfactant and co-surfactant of the low dosage hydrate inhibitor blend disclosed herein have a beneficial, unexpected, synergistic effect on the ability of the inhibitor blend to mitigate problems caused by the formation of gas hydrates in a well fluid. This synergy is particularly effective in connection with offshore wells and related conduits and pipelines, and in association with condensed water environments. Even though the low dosage hydrate inhibitor blend disclosed herein falls into the class of products referred to as low dosage hydrate inhibitors and is therefore referred to as the same, it does not necessarily inhibit hydrate formation in the well fluid. However, the low dosage hydrate inhibitor blend disclosed herein prevents the agglomeration of small hydrate clusters into large plugs and thereby mitigates problems caused by gas hydrates in well fluids.

For example, the low dosage hydrate inhibitor blend disclosed herein tends to be stable at high temperatures. It has a low tendency to form emulsions and therefor results in a relatively clean water quality. The low dosage hydrate inhibitor blend can be used in a significantly lower amount than the amount required when the cationic surfactant or co-surfactant is used alone, or compared to the amount required of low dosage hydrate inhibitors used heretofore. This saves on capital expenditures and operating costs, and is easier on the environment.

For example, the low dosage hydrate inhibitor blend disclosed herein solves a logistics issue in connection with offshore operations. It is environmentally friendly in that it can be used in a lower amount and has low tendency to form emulsions in water.

The exemplary chemicals, compounds, additives, agents and fluids ("exemplary components") disclosed herein may directly or indirectly affect one or more components or pieces of equipment associated with the preparation, delivery, recapture, recycling, reuse, and/or disposal of the disclosed exemplary components. For example, the disclosed exemplary fluids may directly or indirectly affect one or more components or pieces of equipment associated with a well, hydrocarbon storage equipment and hydrocarbon transportation equipment, including, but not limited to, any transport vessels, conduits, pipelines, trucks, tubulars, and/or pipes used to fluidically move the exemplary components from one location to another, any pumps, compressors, or motors used to drive the exemplary fluids into motion, any valves or related joints used to regulate the pressure or flow rate of the exemplary fluids, and any sensors (i.e., pressure and temperature), gauges, and/or combinations thereof, and the like.

EXAMPLES

The following examples illustrate specific embodiments consistent with the present disclosure but do not limit the scope of the disclosure or the appended claims. Concentrations and percentages are by weight unless otherwise indicated.

Example 1

Rocking Cell Experiments

A rocking cell test apparatus was used to test the low dosage hydrate inhibitor blend disclosed herein. The cationic surfactant of the inhibitor blend tested is shown by formula (1) above wherein $R^1$ is a mixture of alkyl and alkenyl groups having 5 to 17 carbon atoms, $R^2$ and $R^3$ are alkyl groups having 4 carbon atoms, $R^4$ is an alkyl group having 1 carbon atom, and X— is sulfonate. The co-surfactant of the inhibitor blend was a mixture of polyetheramines, specifically a mixture of a polyoxypropylene diamine and a 3,6-dioxaoctamethylenediamine.

The experiments were performed at a constant mass after the initial saturation period. A constant mass experiment requires a fixed volume of gas to pressurize the cell and carry out the test. There is not an additional supply of gas during the test.

The tests were carried out under the following conditions:
(a) a 2800 psig initial pressure;
(b) a 20° C. initial temperature;
(c) a 4° C. final temperature;
(d) a 15 cycles/min rocking rate;
(e) a 25° rocking angle;

(f) water cuts (WC) of 15%;
(g) a cooldown period of from 20° C. to 4° C. over 1 hour;
(h) using condensed water; and
(i) using a shut in/re-start simulation.

The oil was pre-conditioned by heating and shaking it up at 70° C. for 1 hour. Proper amounts of oil, water and inhibitor were injected into the cells. Thereafter, the cells were pressurized to the designated pressure with Green Canyon gas, a common Gulf of Mexico Type I1 hydrate former. The composition of Green Canyon gas used for this study is provided in Table 1 below.

TABLE 1

Composition of Green Canyon gas

| Composition | Mole % |
| --- | --- |
| N2 | 0.39 |
| nC1 | 87.26 |
| nC2 | 7.57 |
| nC3 | 3.10 |
| iC4 | 0.49 |
| nC4 | 0.79 |
| iC5 | 0.20 |
| nC5 | 0.20 |

During the initial phase of each test, the cells were rocked, at the prescribed angle and rate for a period of 2 hours, in order to sufficiently emulsify the fluids and saturate the liquid phase with gas such that no further gas would be consumed by the liquid phase. Thereafter, the gas inlet valves were closed and the temperature was then ramped down, from 20° C. to 4° C., over a 1 hour time period.

After reaching the designated temperature, rocking was continued for around 18 hours. Thereafter, the motor was pre-programmed to stop for 6 hours, with the cells horizontal to simulate a system shut-in. The shut in period lasted for at least 6 hours, varying only so that the critical re-start could be visually observed. Observations were made throughout the tests. However, particular attention was paid to hydrate formation, including during the period before shut-in and the re-start.

The performance of each low dosage hydrate inhibitor being tested was ranked as a "pass" or a "fail" based on visual observation and sensor data. When hydrate blockages impeded the motion of the ball, the sensors indicated this and the cell was ranked as a "fail." If a cell visually passed, it was confirmed that the sensors did not show any obstruction or hindrance to the movement of the ball before a pass score was given. A pass score indicated that the low dosage hydrate inhibitor would be effective at preventing hydrate agglomeration in the field. The results are shown by Table 2 below.

TABLE 2

Minimum Effective Dosage (MED) for the anti-agglomerant based on rocking cell testing at 15% WC

| Oil | Cationic surfactant | PEA | Superior blend |
| --- | --- | --- | --- |
| Mission Condensate | 8% DR | Fail- 5% DR | 3% DR |
| Sabine 13 Medium Oil | 4% DR | Fail- 5% DR | 1% DR |
| Longhorn Condensate | 8% DR | — | 5% DR |
| MC 773A Dark | 10% DR | — | 8% DR |

The results shown by Table 2 demonstrate the minimum effective dosage for each anti-agglomerate tested. Testing was conducted with different oils at a 15% water cut (WC) in condensed water.

Based on the results, it was determined that the cationic surfactant by itself required a minimum of a 8 volume percent dose rate (DR) to be effective in the Mission Condensate, a minimum of a 4 volume percent DR to be effective in the Sabine 13 Medium Oil, a minimum of a 8 volume percent DR to be effective in the Longhorn Condensate, and a minimum of a 10 volume percent DR to be effective in the MC 773A Dark Oil. When dosed into the Mission Condensate and Sabine 13 Medium Oil, the polyetheramine (PEA) showed no anti-agglomerate performance.

The results indicate that in all three oils tested, the inhibitor blend disclosed herein is effective at preventing hydrate agglomeration at a much lesser dose rate compared to the cationic surfactant by itself. This clearly verifies that a significant reduction in the minimum effective dosage (MED) can be obtained by using the inhibitor blend disclosed herein.

Example 2

Maximum Treated Water Cut (MTWC)

In another series of study, the MTWC (Maximum Treated Water Cut) was evaluated on the low dosage inhibitor blend disclosed herein. The results are summarized in Table 3 below.

TABLE 3

MTWC for the anti-agglomerant based on rocking cell testing

| Oil | Cationic surfactant | PEA | Superior blend |
| --- | --- | --- | --- |
| Mission Condensate | 15% WC, 8% DR | 15% WC, Fail- 5% DR | 35% WC, 8% DR |
| Sabine 13 Medium Oil | 15% WC, 4% DR | 15% WC Fail- 5% DR | 25% WC, 4% DR |
| MC 773A Dark | 15% WC, 10% DR | — | 20% WC, 10% DR |

The results indicate that at the same dose rate as the baseline cationic surfactant, the low dosage inhibitor blend disclosed herein is effective at a substantially higher water cut.

Therefore, the present low dosage hydrate inhibitor blend and method are well adapted to attain the ends and advantages mentioned, as well as those that are inherent therein. The particular examples disclosed above are illustrative only, as the apparatus may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present process and system. While the present apparatus and components thereof may be described in terms of "comprising," "containing," "having," or "including" various steps or components, the apparatus can also, in some examples, "consist essentially of" or "consist of" the various steps and components. Also, the terms in the claims have their plain, ordinary meaning unless otherwise explicitly and clearly defined by the patentee.

What is claimed is:

1. A low dosage hydrate inhibitor blend consisting essentially of:
a cationic surfactant, wherein said cationic surfactant has the structural formula:

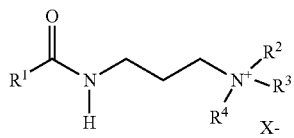

wherein: $R^1$ is an alkyl group or alkenyl group having from 5 to 22 carbon atoms, $R^2$ and $R^3$ are alkyl groups having from 1 to 6 carbon atoms, $R^4$ is a hydrogen atom or an alkyl group having from 1 to 6 carbon atoms, and X— is a carboxylate, an acrylate, a methacrylate, a halide, a phosphonate, a sulfate, a sulfonate, a hydroxide, a carbonate, or any combination thereof; and
a co-surfactant, wherein said co-surfactant is present in the inhibitor blend in an amount of no greater than about 10 percent by weight based on the total weight of said blend.

2. The low dosage hydrate inhibitor blend of claim 1, wherein the cationic surfactant has the structural formula (1), shown below:

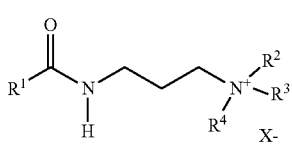

(1)

wherein: $R^1$ is an alkyl group having from 11 to 17 carbon atoms, $R^2$ and $R^3$ are alkyl groups having from 1 to 4 carbon atoms, $R^4$ is a hydrogen atom or an alkyl group having from 1 to 2 carbon atoms, and X— is a sulfonate, a carbonate, or any combination thereof.

3. The low dosage hydrate inhibitor blend of claim 1, wherein said co-surfactant is present in the inhibitor blend in an amount in the range of from about 0.01% by weight to about 10% by weight, based on the total weight of the inhibitor blend.

4. The low dosage hydrate inhibitor blend of claim 1, wherein said co-surfactant includes at least one polyetheramine.

5. The low dosage hydrate inhibitor blend of claim 1, wherein said co-surfactant consists essentially of a mixture of two or more polyetheramines.

6. The low dosage hydrate inhibitor blend of claim 4, wherein the amino group of said polyetheramine(s) is a primary amino group.

7. The low dosage hydrate inhibitor blend of claim 4, wherein the polyether backbone of said polyetheramine(s) can be based on propylene oxide, ethylene oxide, or a combination thereof.

8. The low dosage hydrate inhibitor blend of claim 4, wherein said polyetheramine(s) is selected from the group consisting of compounds that include one or more primary or secondary monoamines, diamines or triamines attached to one or both ends of a polyether backbone, and any combination of such compounds.

9. The low dosage hydrate inhibitor blend of claim 4, wherein said polyetheramine(s) is a compound that includes a primary diamine attached to an end of a polyether backbone that is based on propylene oxide or ethylene oxide.

10. The low dosage hydrate inhibitor blend of claim 4, wherein said polyetheramine(s) is selected from the group consisting of a polyoxypropylene diamine, a 3,6-dioxaoctamethylenediamine, and mixtures thereof.

11. A method of treating a well fluid, comprising:
combining a low dosage hydrate inhibitor blend with the well fluid, said low dosage inhibitor blend consists essentially of:
a cationic surfactant, wherein said cationic surfactant has the structural formula:

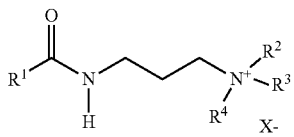

wherein: $R^1$ is an alkyl group or alkenyl group having from 5 to 22 carbon atoms, $R^2$ and $R^3$ are alkyl groups having from 1 to 6 carbon atoms, $R^4$ is a hydrogen atom or an alkyl group having from 1 to 6 carbon atoms, and X— a carboxylate, an acrylate, a methacrylate, a halide, a phosphonate, a sulfate, a sulfonate, a hydroxide, a carbonate, or any combination thereof; and
a co-surfactant, wherein said co-surfactant is present in the inhibitor blend in an amount of no greater than about 10 percent by weight based on the total weight of said blend.

12. The method of claim 11, wherein said co-surfactant includes at least one polyetheramine.

13. The method of claim 11, wherein the well fluid includes a fluid produced from a well.

14. The method of claim 11, wherein the well fluid includes a hydrocarbon or a fluid that has or will come into contact with a hydrocarbon.

15. The method of claim 11, wherein the well fluid includes natural gas.

16. The method of claim 11, wherein the well fluid includes a mixture of a liquid hydrocarbon and water, and wherein said mixture has a water cut of greater than about 5%.

17. The method of claim 11, wherein the well fluid includes a mixture of a hydrocarbon and water, and wherein said water includes condensed water.

18. The method of claim 11, wherein the well fluid is associated with an oil and gas well production system.

19. A method of treating a well fluid associated with an oil and gas well production system, comprising:
combining a low dosage hydrate inhibitor blend with the well fluid, said low dosage inhibitor blend consisting essentially of:
a cationic surfactant, wherein said cationic surfactant has the structural formula:

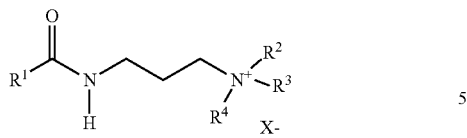

wherein: $R^1$ is an alkyl group or alkenyl group having from 5 to 22 carbon atoms, $R^2$ and $R^3$ are alkyl groups having from 1 to 6 carbon atoms, $R^4$ is a hydrogen atom or an alkyl group having from 1 to 6 carbon atoms, and X— a carboxylate, an acrylate, a methacrylate, a halide, a phosphonate, a sulfate, a sulfonate, a hydroxide, a carbonate, or any combination thereof; and a co-surfactant, wherein said co-surfactant is present in the inhibitor blend in an amount of no greater than about 10 percent by weight, based on the total weight of said blend, and includes at least one polyetheramine.

20. The method of claim 19, wherein said low dosage hydrate inhibitor blend is combined with the well fluid using mixing equipment.

* * * * *